United States Patent [19]

Johnson

[11] Patent Number: 4,515,851

[45] Date of Patent: * May 7, 1985

[54] SLIP RESISTANT SURFACES

[75] Inventor: Michael D. Johnson, Coshocton, Ohio

[73] Assignee: Becton, Dickinson and Company, Paramus, N.J.

[*] Notice: The portion of the term of this patent subsequent to Apr. 30, 2002 has been disclaimed.

[21] Appl. No.: 436,253

[22] Filed: Oct. 25, 1982

[51] Int. Cl.³ .............................................. B32B 7/00
[52] U.S. Cl. .................... 428/246; 2/161 R; 2/168; 428/250; 428/253; 428/284; 428/304.4; 428/316.6
[58] Field of Search ............... 428/245, 246, 250, 253, 428/254, 284, 304.4, 316.6; 2/161 R, 167, 168

[56] References Cited

U.S. PATENT DOCUMENTS

| | | | |
|---|---|---|---|
| 2,293,923 | 8/1942 | Beal | 51/73 R |
| 2,293,927 | 8/1942 | Beal | 427/246 |
| 2,522,612 | 9/1950 | Harben | 428/318.4 |
| 3,173,150 | 3/1965 | Mohler | 2/167 |
| 3,355,535 | 11/1967 | Hain et al. | 428/309.9 |
| 3,650,867 | 3/1972 | Bauer | 156/307.3 |
| 4,089,069 | 5/1978 | Vistins | 2/161 R |
| 4,151,662 | 5/1979 | Vistins | 2/168 X |
| 4,174,542 | 11/1979 | Vistins | 2/48 |
| 4,359,783 | 11/1982 | Andrews | 2/161 R |

Primary Examiner—James J. Bell
Attorney, Agent, or Firm—Robert P. Grindle

[57] ABSTRACT

An improved slip and/or skid resistant surface is provided for work gloves, work shoes, floor coverings in work areas and the like. The surface of the invention provides a porous gripping surface particularly useful in greasy and oily environments where it is necessary for a workman to be able to grip mechanical devices or loose objects having a coating of oil or grease. The surface of the invention is a foam surface laminated to a substrate. The foam, prior to lamination, may be foamed with varying amounts of air depending upon the degree of abrasion resistance required. The foaming may be by mechanical or chemical means.

6 Claims, 1 Drawing Figure

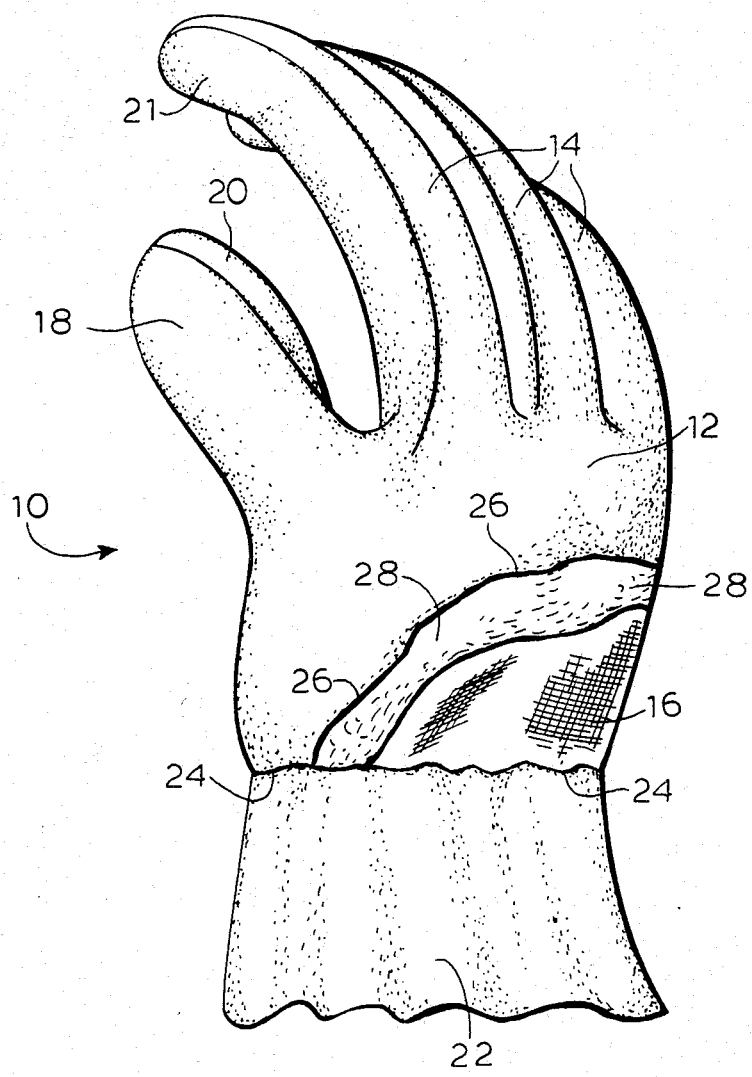

SLIP RESISTANT SURFACES

BACKGROUND AND STATEMENT OF THE INVENTION

This invention relates to methods for producing a laminate useful in the manufacture of wearing apparel, for example, or floor coverings and to laminates so produced wherein a slip resistant or skid resistant gripping surface is required. The laminate includes a porous foamed surface which is useful as a gripping surface for the work environment, and the method of the invention is such that the gripping surface may be controlled to have a lesser or greater degree of abrasion resistance, as required for the subsequent use of the article involved. The invention includes a substrate which may be a fabric web comprised of a non-woven fibrous web, such as needled felt, a knitted fabric web such as knitted jersey, or a woven fabric, for example. The substrate may be comprised of natural or synthetic fibers or blends thereof including, for example, polyester, or a polyester-cotton blend. The foamed surface is applied to the substrate. The resulting foam surface is porous, as will be understood, and has the property of absorbing oil, water or grease on surfaces so as to provide an enhanced gripping property to the skid resistant surface of the invention. The foam may be comprised of polyurethane, for example, polyvinyl chloride, acrylonitrile, neoprene, or other natural or synthetic rubbers. In addition, in certain applications, it may be appropriate to include a moisture barrier between the substrate and the foam surface. The barrier may be applied as a coating on the substrate, for example. Representative moisture barrier coatings include polyvinyl chloride, acrylonitrile, natural or synthetic rubbers. The moisture barrier layer will be selected to be compatible with the subsequently applied foam layer, as will be understood.

In the past, it has been conventional, in order to apply gripping surfaces to work gloves and such items of wearing apparel or skid resistant floor coverings, to provide a textured surface in one form or another. However, certain disadvantages are involved in the use of such textured surfaces in work gloves and the like in that in an oily or greasy environment, the gripping is not to the degree necessary in order to provide a firm gripping action for a workman in a dangerous situation. Also, such wearing apparel, and particularly work gloves in some forms, have a tendency to be stiff and unyielding in use.

DETAILED DESCRIPTION OF THE INVENTION

With this invention, by contrast, the laminate of the invention provides a substantially increased gripping action to a surprising degree. That is, with the laminate of the invention comprised of a substrate to which a foamed surface is applied, the porous foamed surface serves to provide a combined gripping of the object to be held and an absorption of the oil, grease or water on the surface which would ordinarily make it slippery. The degree of safety involved when using work gloves formed according to the invention is extraordinary as compared to prior art textured surfaces. At the same time an enhanced suppleness is built into articles of clothing including work gloves, making them more comfortable and again, safer for gripping articles in the work environment. While the surfaces herein are ordinarily appropriate for use in work environments to provide a gripping action for oily or greasy surfaces, it will be appreciated that floor coverings or decks on boats, for example, may utilize the laminate of the invention with the slip resistant surface to provide a gripping action for passengers on a boat in an area exposed to water routinely. Other uses may be surfaces for floor coverings in galleys of aircraft and the entrances thereof in order to avoid the slipping of passengers or aircraft personnel in environments where there may be moisture, oil, or grease on the floor.

In considering generally the conditions for carrying out the invention here for producing the skid resistant and/or "oil grip" surface of the invention, one may note that it is preferable to use a synthetic non-woven web as the substrate, although it will be appreciated that a knitted or woven web may also be used, depending upon the ultimate application of the skid resistant surface herein. Also, the skid resistant surface can be applied over other substrates including coated fabrics, coated gloves, or any continuous surface including unsupported gloves which contain no fabric. As discussed above, such coatings may include a liquid impervious coating applied to the substrate to close any interstices therein. Such continuous coatings protect the user of work gloves, for example, from the liquid involved in the work environment for which the skid or slip resistant coating is utilized.

Representative fibrous non-woven webs may be comprised of wool, polyesters, polyamides, such as Kevlar or Nomex which are products of DuPont, polyolefins, such as polypropylene and polyethylene and copolymers of acrylic acid, such as polyacrylonitrile. If a knitted web substrate is used, it may be cotten, polyester, or a cotton-polyester blend. If it is woven, it may be nylon or cotton. The material forming the foamed surface portion of the laminate, in accordance herewith, as discussed above, may be polyurethane, polyvinyl chloride, acrylonitrile, natural or synthetic rubber. The material is foamed either by mechanical or chemical means. Preferably, it is foamed by mechanical means to have an air content within the range of between about 10 and 65 percent. The preferred range is 15 to 30 percent. Better abrasion resistance is obtained with a lower air content within the ranges noted above, while better grip and less abrasion resistance is obtained with an air content of a higher percent within the ranges noted above. If a coated substrate is utilized as a moisture barrier, for example, the coating will be selected to be compatible with the subsequently applied foam surface layer. Representative coatings applied to the substrates of the invention include polyvinyl chloride, acrylonitrile, natural rubbers or synthetic rubbers.

One of the important aspects of the invention here is the fact that the surface may be renewed for its gripping function. That is, assuming a work glove with a porous gripping surface, in accordance with this invention, once the glove has been used for a period of time so that it may lose its gripping properties, the glove may be merely squeezed to remove the oil or grease build up within the pores of the glove to renew its gripping properties. Obviously, as will be understood, if the surface of the invention is used in an environment where water is the material causing the slipping or slippery environment, it will evaporate over a period of time when the gripping surface is not being used. This is particularly true in skid resistant deck coverings for boats, for example.

With the foregoing and additional objects in view, this invention will now be described in more detail, and other objects and advantages thereof will become apparent from the following description, the accompanying drawing, and the appended claims.

DESCRIPTION OF THE DRAWING

The single drawing is a perspective view partially broken away of a glove illustrating the invention.

DETAILED DESCRIPTION OF THE INVENTION

Referring to the single drawing, a work glove 10 is shown with a foamed surface 12. The breakaway line 26 delineates the border between the substrate 16 and the backside surface 12. The glove 10 includes a thumb portion 18 and individual finger portions 14. The backside portion 12, may or may not be coated with the foam skid resistant surface of the invention depending upon particular applications, while the palm portion as represented by the surface 20 on thumb 18 and surface 21 will be coated to provide the skid resistant surface. The glove, in the vicinity of the wrist may include an elastic insert 24 in order to provide a gripping property to the glove around the wrist, once the glove is pulled onto the hand. The cuff 22 may be coated in a manner similar to the rest of the glove. Alternatively, the cuff may be comprised merely of the substrate material 16 and left uncoated. A moisture barrier 28 may be applied to substrate material 16, if so required for certain applications.

The invention is such that the article which is to have the oil grip and/or skid resistant surface of the invention may be formed into an article such as a glove or work boot, for example, and subsequently the formed article may be dipped to have applied to it the compounded foamed material to the desired surfaces such as the palm of a glove or the sole of a work boot. Once the application is made of the compounded foamed material, it is then cured in place. Alternatively, the substrate may be formed first by having a sheet of the substrate woven or non-woven fabric for example, and applying the foamed material to it and curing the foamed layer prior to taking that formed laminate material and cutting it into pieces to be sewn into an article. It is less expensive, from a production standpoint, as will be understood by practitioners in the art, to dip an entire article already formed into the foamed material forming the outer surface, than to cause a coating to be formed on only selected portions of the article. However, full dipping uses more foamed material.

With respect to the foamed coating material used for applying to the substrate for forming the article, in accordance with this invention, representative such compositions are as follows. It is to be understood, however, that these representative compositions are being presented with the understanding that they are to have no limiting character on the broad disclosure of the invention as generally set forth herein and as directed to men skilled in the art.

| Material | Parts by Dry Weight |
| --- | --- |
| COMPOSITION 1 | |
| Polyvinyl Chloride Latex | 100 |
| Plasticizer | 70 to 120 |
| Surfactant | 1 to 5 |
| Pigment | 1 |
| Thickener | 5 |
| COMPOSITION 2 | |
| Acrylonitrile Latex | 100 |
| Surfactant | 0.15 to 1 |
| Zinc Oxide | 3 |
| Pigment, Thickener | 5 |
| COMPOSITION 3 | |
| Polyurethane Latex | 100 |
| Crosslinking Agent | 5 |
| Surfactant | 3 |
| Pigment | 1 |
| Thickener | 1 |

Once the foamed layer is applied, it is cured by conventional means including the application of heat, or by chemical cross-linking.

As further illustrative of the method of the invention, one may note the following example in which a laminate was prepared, which laminate was then cut into pieces and sewn into a glove. It is to be understood, however, that this example is being presented with the understanding that it is to have no limiting character on the broad disclosure of the invention as generally set forth herein and as directed to men skilled in the art.

EXAMPLE 1

A three liter container was charged with 3.17 pounds of Polyco 2622, a polyvinyl chloride latex manufactured by Borden Chemical, a division of Borden Inc. of Leominster, Mass. Gentle mixing was begun with a mixer using a low shear impeller. While mixing, 8 grams of a sodium alkylether sulfate, Emersal 6453 manufactured by Emery Industries, Inc., Cincinnati, Ohio; 640 grams of DOP, a plasticizer manufactured by BASF Wyandotte, Parsippany, N.J.; 24 grams of Admex 710, a plasticizer manufactured by Sherex Chemical Co., Inc., Dublin, Ohio; 8 grams of W7017, a pigment manufactured by Harshaw Chemical Co., Cleveland, Ohio; and 10 grams of a 50% aqueous solution of Acrysol GS, a thickener manufactured by Rohm and Haas Co., Philadelphia, Pa. was added to the latex. This mixture was then blended with air to yield a density of about 0.8 grams per cubic centimeter.

The resulting composition containing approximately 20% air by volume was directly knife-coated onto an unnapped knitted cotton fabric at a knife setting of 65 mils. This laminate was then placed in a 325° F. oven for 20 minutes to dry and fuse the coated material. Pieces were then cut from the material and sewn into a pair of gloves.

While the methods and products herein disclosed form preferred embodiments of the invention, this invention is not limited to those specific methods and products, and changes can be made therein without departing from the scope of the invention, which is defined in the appended claims. For example, as will be appreciated by practitioners-in-the-art, various polymeric coatings may be utilized selected from a wide variety of polymers in order to have an ultimate gripping surface of varying properties and appearance depending upon the application of the apparel or floor covering which may be formulated. Also, it will be appreciated that a substrate may be formed to provide, initially, a roughened surface to which the foamed material is applied in order to provide not only an "oil grip" type surface but also a textured gripping surface in combination.

As illustrative of a procedure for providing such a textured substrate surface for the subsequent application of the foamed skid resistant material, in accordance herewith, reference is made to co-pending application Ser. No. 233,743 filed Feb. 12, 1981 which is incorporated herein by reference in its entirety. The development of a roughened textured substrate in accordance with the teachings of that application may be useful, depending upon the subsequent use to which an article formed in accordance with this invention is to be used. That is, an oil grip surface which is porous and absorbs greasy or oily materials on a work object and provides in addition, a textured gripping action will enhance the ability of a workman, for example, to grip and hold objects in the work environment.

It will be appreciated further, that the objects of the invention herein, since they may be formed into final articles prior to the application of an oil gripping surface, or they may be formed from a previously prepared laminate of the oil gripping surface and a substrate, many different mass production techniques may be utilized in the formulation of articles in accordance with this invention. Obviously a variety of mass production techniques may be applied making the products of the invention here highly advantageous commercially.

I claim:

1. A laminate for providing a garment having an exposed slip resistant gripping surface for use in a grease, oil or water work environment, characterized by
   (a) a substrate, said substrate being a member selected from the group consisting of a non-woven fibrous web, a woven web, and a knitting web;
   (b) a foamed layer applied to one surface of said substrate;
   (c) said foamed layer forming the outer gripping surface for a garment made from such laminate; and
   (d) said foamed layer having an air content within the range of between about 10 to 65 percent.
2. The laminate of claim 1, further characterized by
   (a) said foamed layer is a member selected from the group consisting of polyurethane, polyvinyl chloride, acrylonitrile; natural rubber, synthetic rubber and mixtures thereof.
3. The laminate of claim 1, further characterized by
   (a) said foamed layer having an air content within the range of between 15 to 30 percent.
4. The laminate of claim 1, further characterized by
   (a) said substrate is comprised of a material selected from the group consisting of wool, polyesters, polyamides, cotton, polypropylene, polyethylene, polyacrylonitrile, nylon and mixtures thereof.
5. The laminate of claim 1, further characterized by
   (a) a moisture barrier coating on one surface of said substrate; and
   (b) said foamed layer applied to said moisture barrier coating.
6. The laminate of claim 5, further characterized by
   (a) said moisture barrier coating is selected from the group consisting of polyvinyl chloride, acrylonitrile, synthetic rubber, natural rubber, and mixtures thereof.

* * * * *